United States Patent [19]

Marien et al.

[11] Patent Number: 5,239,049
[45] Date of Patent: Aug. 24, 1993

[54] SELECTED POLY(DIANHYDRIDES) COMPOUNDS, SELECTED POLY(AMIC ACID) COMPOUNDS, AND SELECTED POLY(IMIDE) COMPOUNDS

[75] Inventors: Bruce A. Marien, Woodbridge; Keith O. Wilbourn, Manchester, both of Conn.

[73] Assignee: Olin Corporation, Cheshire, Conn.

[21] Appl. No.: 980,058

[22] Filed: Nov. 23, 1992

Related U.S. Application Data

[62] Division of Ser. No. 808,141, Dec. 16, 1991, Pat. No. 5,206,335.

[51] Int. Cl.$^5$ .................... C08G 69/26; C08G 73/12
[52] U.S. Cl. .................... 528/353; 528/125; 528/128; 528/170; 528/171; 528/172; 528/173; 528/174; 528/183; 528/185; 528/188; 528/189; 528/206; 528/208; 528/220; 528/224; 528/226; 528/229; 528/322; 528/350; 528/352
[58] Field of Search ............... 528/353, 206, 208, 183, 528/185, 188, 189, 220, 229, 220, 224, 170, 172, 173, 174, 171, 322, 350, 352, 353, 128, 125

[56] References Cited

U.S. PATENT DOCUMENTS

| | | | |
|---|---|---|---|
| 3,845,018 | 10/1974 | Miller et al. | 528/128 |
| 4,097,456 | 6/1978 | Barie, Jr. | 528/170 |
| 4,251,418 | 2/1981 | Chow | 528/170 |
| 4,251,420 | 2/1981 | Antonoplos | 528/170 |
| 4,405,770 | 9/1983 | Schoenberg | 528/172 |
| 4,480,088 | 10/1984 | Pike | 528/353 |

FOREIGN PATENT DOCUMENTS 1568700 5/1969 France .

OTHER PUBLICATIONS

C. E. Sroog; J. Polymer Science, Macromolecular Review, 11, 161 (1976).
A. K. St. Clair and T. L. St. Clair "The Development of Aerospace Polyimide Adhesives" in Polyimides, K. L. Mittal, Ed. vol. 2, Plenum Press, New York (1984).
F. Ramirez, H. Yomanaka, and O. H. Basedow Journal of American Chemical Soc., 83, 173 (1961).
Fausto Ramirez; John S. Ricci, Jr.; Hikotada Tsuboi; James F. Mareck; and Hiroshi Yamanski "Crystal and Molecular Structure of trans-Biphthalyl, C16 H804. Reaction of Substituted Phthalic Anhydrides with Trialkyl Phosphites" J. Org. Chem., vol. 41, No. 24, 1976, 3909–3914.
G. Knothe et al. "Polymeric Phthalocyanines and Their Precursors 16a) A Structure Model for Polymeric Phthalocyanines" Makromol. Chem. 190, pp. 1573–1586 (1989) [pp. 1573–1575].

Primary Examiner—John Kight, III
Assistant Examiner—P. Hampton-Hightower
Attorney, Agent, or Firm—William A. Simons

[57] ABSTRACT

Poly(dianhydride) compounds having formulae (I) and (II):

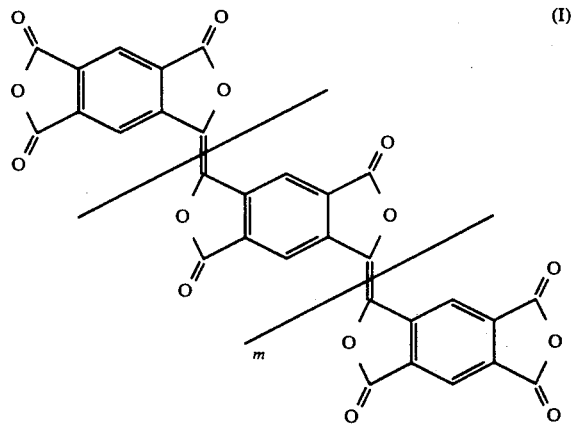

where m is 0 to 50.

(Abstract continued on next page.)

ABSTRACT
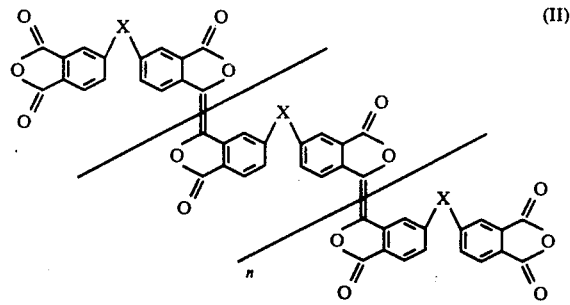
wherein n is 0 to 20 and X is bond junction, oxygen atom, sulfur atom, $SO_2$, $C(CF_3)$, CO, $C(CH_3)_2$, $CF_2-O-CF_2$, $CH_2$, and CHOH.
8 Claims, No Drawings

SELECTED POLY(DIANHYDRIDES) COMPOUNDS, SELECTED POLY(AMIC ACID) COMPOUNDS, AND SELECTED POLY(IMIDE) COMPOUNDS

This application is a division of application Ser. No. 07/808,141 filed Dec. 16, 1991, now U.S. Pat. No. 5,206,335.

BACKGROUND OF THE INVENTION

1. Field of the Invention

The present invention relates to selected poly(dianhydride) compounds made by the polymerization of certain aromatic dianhydrides. The present invention also relates to selected poly(dianhydride) compounds terminated with reactive end groups. The present invention further relates to selected poly(amic acid) compounds and selected poly(amic acid) compounds terminated with reactive end groups both of which are based on said selected poly(dianhydride) compounds. Still further, the present invention relates to selected poly(imide) compounds and selected poly(imide) compounds terminated with reactive end groups, both of which are based on selected poly(dianhydride) compounds.

2. Brief Description of the Prior Art

Dianhydrides are known precursors to many chemical products, including poly(amic acids) and poly(imide) resins. See, for example, C. E. Sroog, *J. Polymer Science*, Macromolecular Reviews, 11, 161 (1976). Known dianhydrides include 1,2,4,5-benzene tetracarboxylic dianhydride (CAS No. 89-32-7) also known as pyromellitic dianhydride (PMDA) which has formula (A):

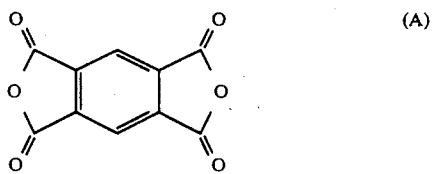

Other known dianhydrides include those in the general formula (B):

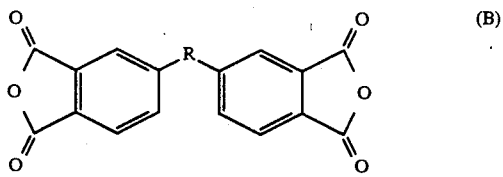

wherein R is an organic or inorganic linking group.

It is known to react dianhydrides with epoxides to form thermoset systems. It is also known to react dianhydrides with diamines to form poly(amic acids). For example, see the Sroog article cited above.

Also, it is known to convert poly(amic acids) into poly(imide) resins. See U.S. Pat. No. 4,480,088 which issued to Pike on Oct. 30, 1984.

It is also known to react poly(imides) with polymerizable end groups having amino functionalities to form poly(imides) terminated with reactive end groups. See, for example, U.S. Pat. No. 3,845,018 which issued to N. Bilow, A. L. Landis, and L. J. Miller on Oct. 29, 1974.

It is also known that poly(imides) and poly(imides) terminated with reactive end groups have utility as adhesives. See, for example, A. K. St. Clair and T. L. St. Clair "The Development of Aerospace Polyimide Adhesives" in *Polyimides*, K. L. Mittal, Ed. Vol. 2, Plenum Press, New York (1984).

It is also known to dimerize anhydrides to form bislactones are different in chemical structure from dianhydrides. See F. Ramirez, H. Yomanaka, and O. H. Basedow *Journal of American Chemical Soc.*, 83, 173 (1961).

There is still a need for better high temperature epoxy systems which can be used as adhesives and composite matrices (e.g., composites used in aerospace applications). It is believed that the poly(dianhydrides) of the present may be suitable curatives for these epoxy systems.

There is also a need for better rigid-rod resin systems (i.e., where the resin structure has limited flexibility) to provide better strength to adhesives and composite matrices. It is believed that the poly(dianhydrides) with reactive end groups of the invention may solve this need for some applications.

There is also a need for resin systems which have a rigid rod portion and a flexible portion to provide both strength and flexibility to adhesives and composite matrices.

There is also a need for poly(imide)-type polymers which are more thermally stable and have more strength than the conventional ones made by dianhydrides and diamines. It is believed that the poly(imides) and poly(imides) with reactive end groups provide better thermal stability and better strength.

BRIEF SUMMARY OF THE INVENTION

Accordingly, the present invention is directed to poly(dianhydride) compounds having formulae (I) or (II):

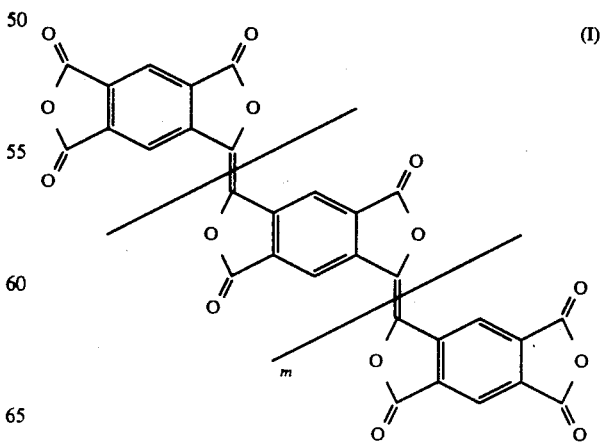

wherein m is 0 to 50; and

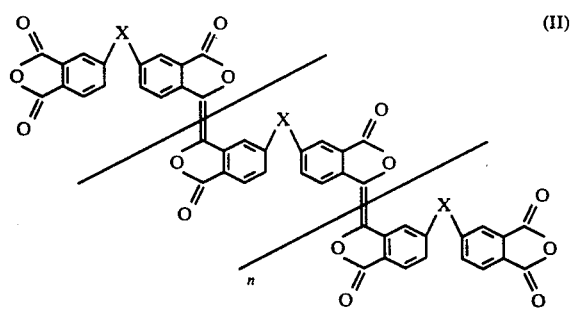

(II)

wherein n is from 0 to 20 and X=bond junction, oxygen atom, sulfur atom, $SO_2$, $C(CF_3)_2$, CO, $C(CH_3)_2$, $CF_2-O-CF_2$, $CH_2$, and CHOH.

The present invention is further directed to poly(dianhydride) compounds terminated with reactive end groups having formulae (III) and (IV):

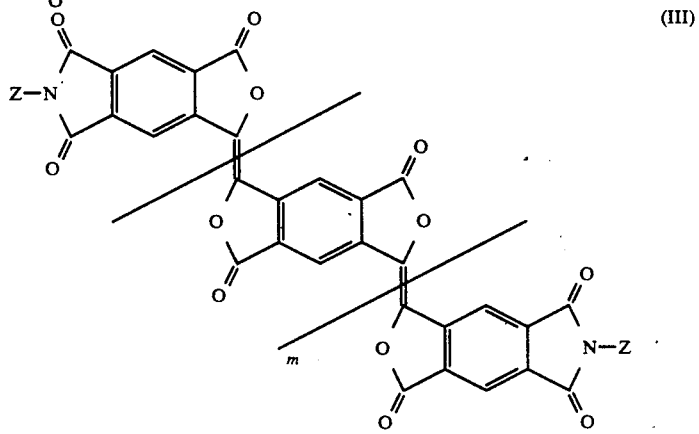

(III)

wherein m is defined as above and Z is selected from the group consisting of benzocyclobutene, a phenylacetylene, a cyclohexeneimide, a NADIC, N-propargylimide, ad a maleimide; and

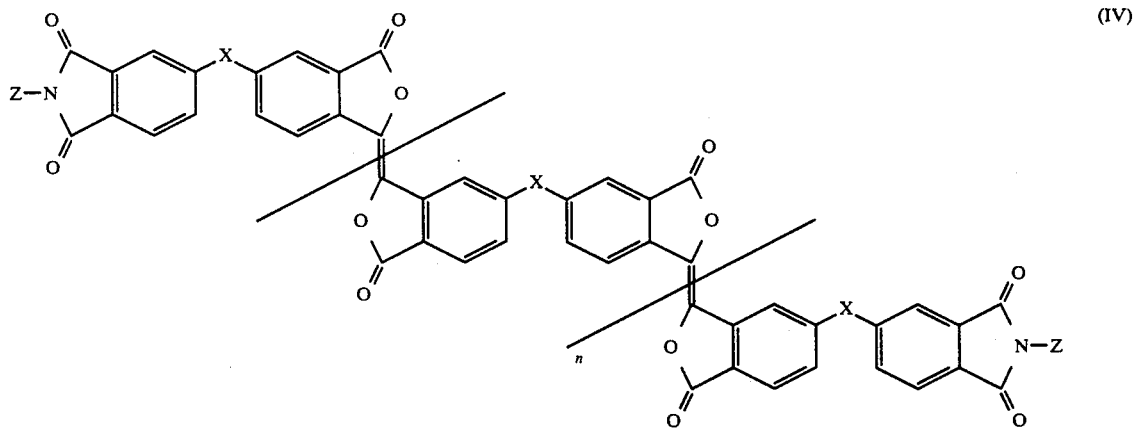

(IV)

wherein X, Z, and n are the same as defined above.

The present invention is is further directed to poly(amic acid) compounds made from a poly(dianhydride) and a diamine and having either formulae (V) or (VI):

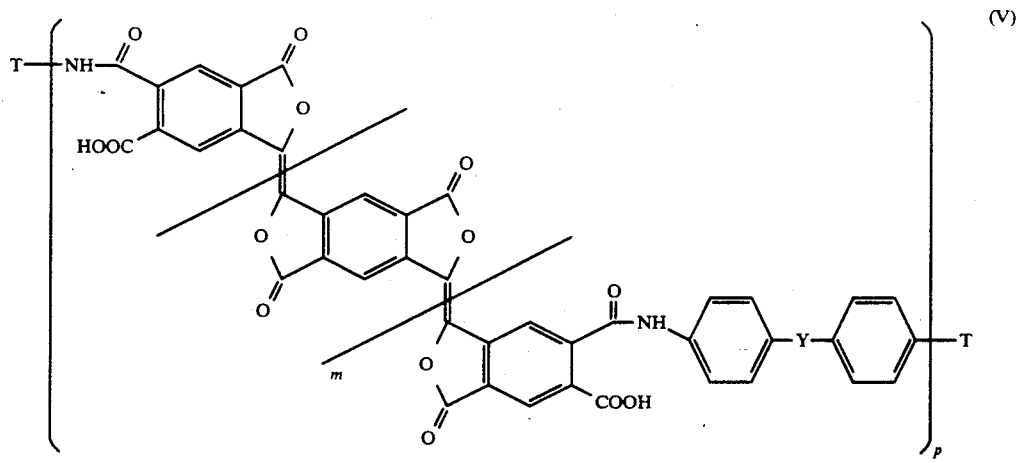

wherein m is the same as defined above and Y is bond junction, oxygen atom, sulfur atom, $CH_2$, $C(CH_3)_2$, $C(CF_3)_2$, CHOH, and $O-C_6H_4-O$; and wherein p is 1 to 100 and wherein T is defined as wither above-defined poly(dianhydride) or diamine used in this synthesis; and The present invention is further directed to poly(amic acid) compounds terminated with reactive end groups made by reacting a poly(dianhydride) of formulae (I) and (II) with a polyamine to form a poly(amic acid) of formulae (V) and (VI) and then reacting said The present invention is is further directed to poly-

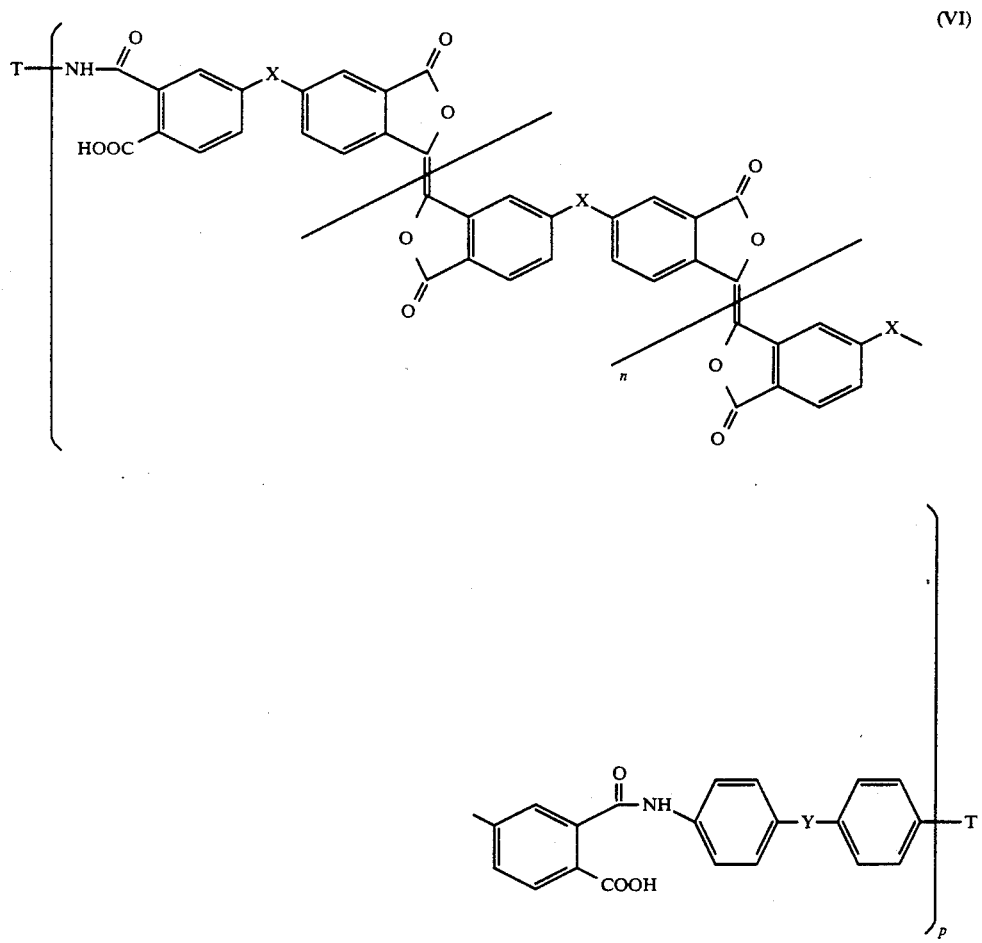

wherein n, T, X, and Y are the same as defined above and wherein q is 1 to 100.

(amic acid) compounds made form poly(dianhydride) and a diamine and having either formulae (V) or (VI):

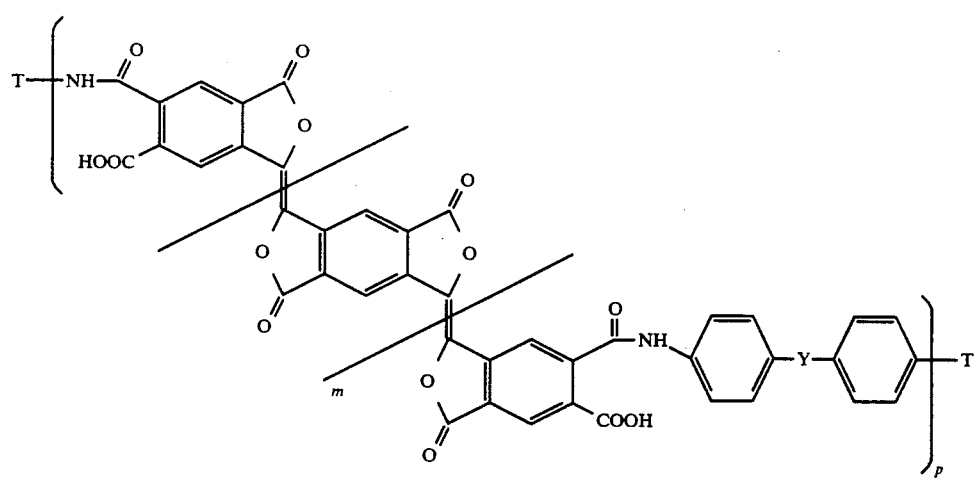

(V)

wherein m is the same as defined above and Y is bond junction, oxygen atom, sulfur atom, $CH_2$, $C(CH_3)_2$, $C(CF_3)_2$, CHOH, and $O-C_4H_6-O$; and wherein p is 1 to 100 and wherein T is defined as either above-defined poly(dianhydride) or diamine used in this synthesis; and The present invention is further directed to poly(amic acid) compounds terminated with reactive end groups made by reacting a poly(dianhydride) of formulae (I) and (II) with a polyamine to form a poly(amic acid) of formulae (V) and (VI) and then reacting said poly(amic acid) with polymerizable reactive groups and having formulae (VII) or (VIII):

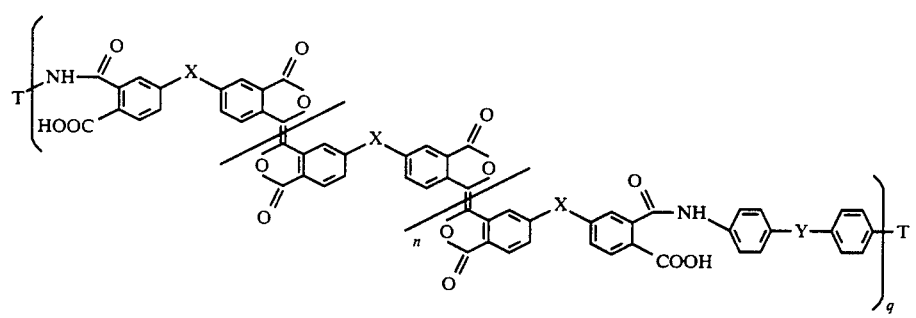

(VI)

wherein n, T, X, and Y are the same as defined above and wherein q is 1 to 100.

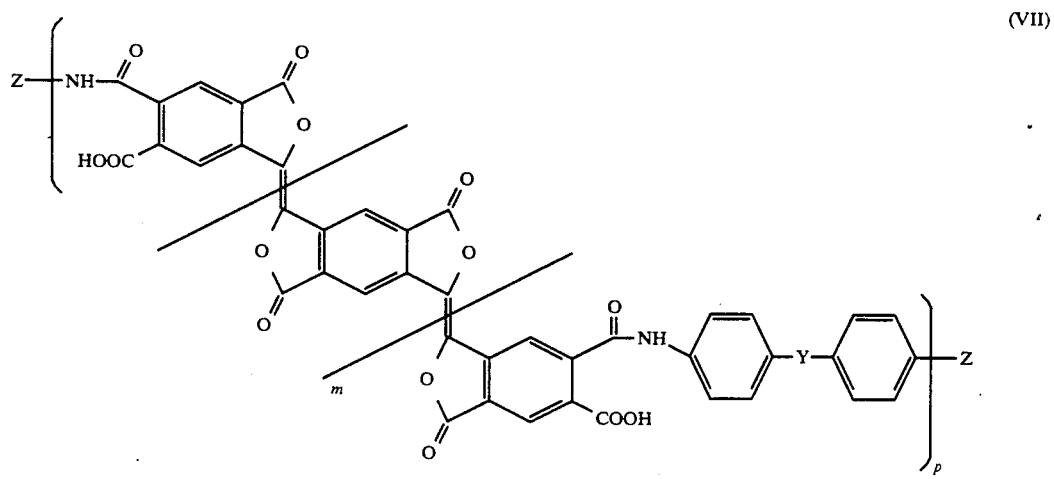

(VII)

wherein m, p, Y, and Z are defined above; and

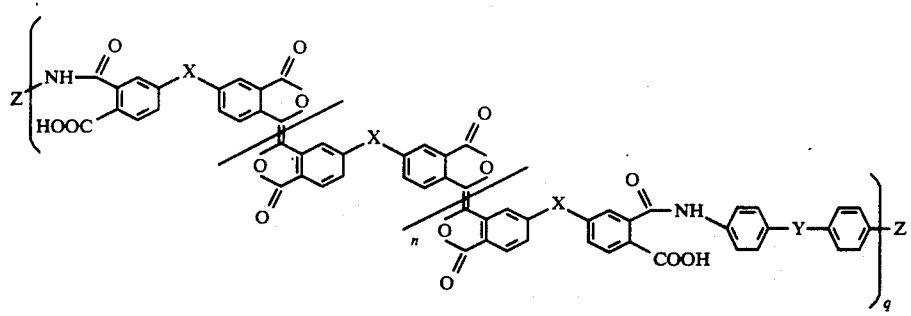

(VIII)

wherein n, q, X, Y, and Z are the same as defined above.

The present invention is further directed to poly(imide) compounds made by dehydrating (either thermally or chemically) the above-noted poly(amic acid) compounds having formulae (V) and (VI).

These poly(imide) compounds are represented by formulae (IX) and (X):

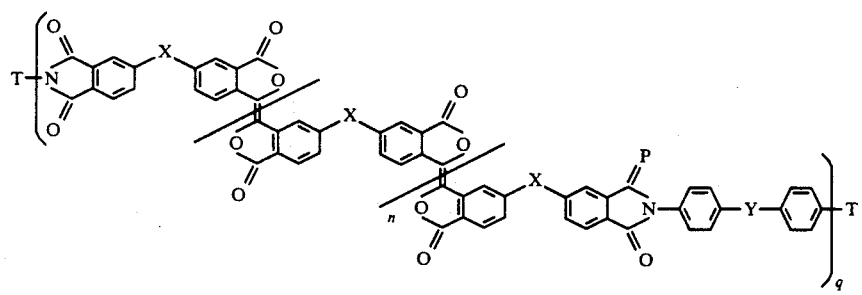

(X)

wherein m, p, T, and Y are the same as defined above.

wherein n, q, T, X, and Y are the same as defined above.

The present invention is further directed to poly(imides) terminated with reactive end groups and made by heating said poly(amic acids) and having reactive end groups of formulae (XII) and (XIII). These poly(imides) terminated with reactive end groups are represented by formulae (XI and XII):

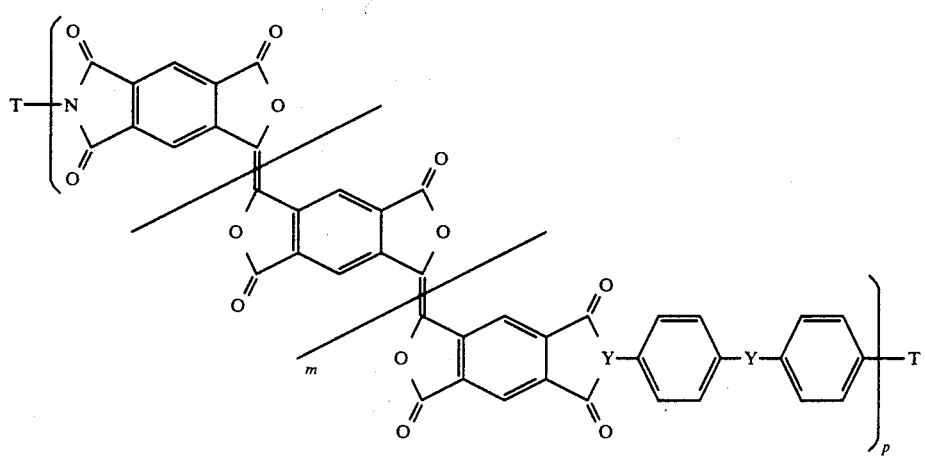

(IX)

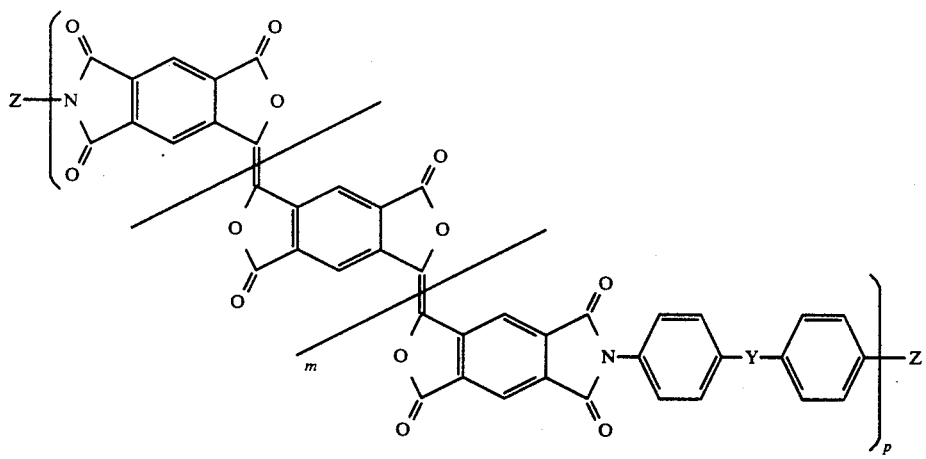

(XI)

wherein m, p, Y, and Z are the same as defined above.

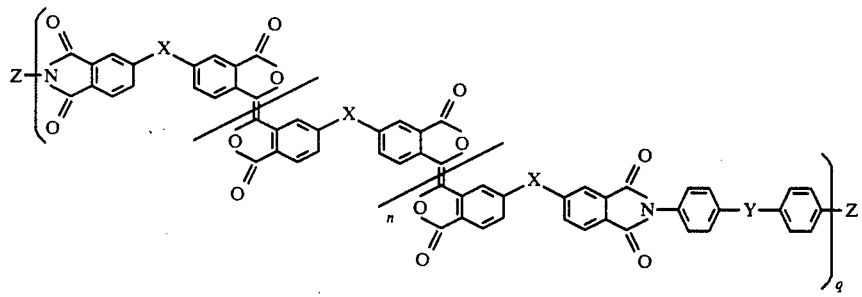

(XII)

wherein n, q, X, Y, and Z are the same as defined above.

DETAILED DESCRIPTION

The term "poly(dianhydride)" as used in the present invention refers to a compound containing two or more dianhydride moieties which are linked together or an isomeric form thereof [e.g., bis(biisocoumarins)].

The precursors to the poly(dianhydrides) of the present invention may be any dianhydride which is capable of being polymerized with a polymerizing agent. Preferred precursors include aromatic dianhydrides such as the following:

3,3'3,4'-benzophenone tetracarboxylic dianhydride [CAS No. 2421-28-5] (also referred to herein as BTDA)

3,3'4,4'-diphenylsulfone tetracarboxylic dianhydride [CAS No. 2540-99-0] (also referred to herein as DSDA)

4,4'-oxydiphthalic anhydride [CAS No. 1823-59-2] (also referred to herein as ODPA)

pyromellitic dianhydride (also referred to herein as PMDA)

The preferred class of polymerizing agents are phosphites. The preferred class of phosphites is trialkyl phosphites. The most preferred phosphite is triethyl phosphite. Other conventional polymerizing agents may be used instead.

The poly(dianhydrides) of the present invention are generally made by introducing the dianhydride precursor and excess polymerizing agent into a reaction vessel and heating the reaction mixture sufficiently to cause the desired polymerization.

If a phosphite polymerizing agent is used, it may also act as a solvent for this reaction. The preferred molar ratio of the dianhydride to phosphite polymerizing agent is from about 1:2 to about 1:100, more preferably from about 1:30 to about 1:60.

The polymerizing reaction is generally carried out at a temperature from about 100° C. to about 250° C., more preferably, from about 120° C. to about 180° C. The reaction is preferably carried out under atmospheric pressure, although super- and subatmospheric pressures may be used.

This polymerization reaction may occur in the presence of an additional solvent. Any polar, high boiling organic solvent capable of dissolving the dianhydride precursors may be employed. Xylene and dichlorobenzene are preferred solvents. However, it is most preferred to employ excess triethyl phosphite as a solvent.

Generally, it is preferred to carry out this polymerization reaction under an inert atmosphere. The preferred inert atmosphere is either a dry nitrogen or a dry argon atmosphere. The polymerization reaction may be carried out in standard chemical reacting vessels which allow heating and the use of an inert atmosphere blanket.

As recovery and purification steps for the poly(dianhydride), it is preferred to use any standard solid-from-liquid filtration apparatus followed by washing with methanol to remove solvent. The preferred filtration means is vacuum filtration.

Poly(dianhydrides) of formulae (I) and (II) which may be made according to this polymerization include the following:

Homopolymers of bis(4,4'-diphthalic anhydride) ethers

Homopolymers of bis(4,4'-diphthalic anhydride) sulfones
Homopolymers of bis(4,4'-diphthalic anhydride) ketones
Poly(biphthalyl) ethers
Poly(biphthalyl) sulfones
Poly(biphthalyl) ketones
Poly(4,4'-oxydiphthalic anhydride)
Poly(3,3'4,4'diphenylsulfone tetracarboxylic dianhydride)

The poly(dianhydrides) of the present invention may be used as curatives for epoxy resins.

The poly(dianhydrides) of the present invention may be reacted with a primary amine compound with a reactive group contained therein to produce the poly(dianhydride) terminated with reactive end groups (Z) of formulae (III) and (IV).

The primary amine compound sued as a precursor for compounds of formulae (III) and (IV) is denoted generically as $H_2N-Z$, wherein Z is defined as above.

The preferred chemical classes of Z include the following six formulae:

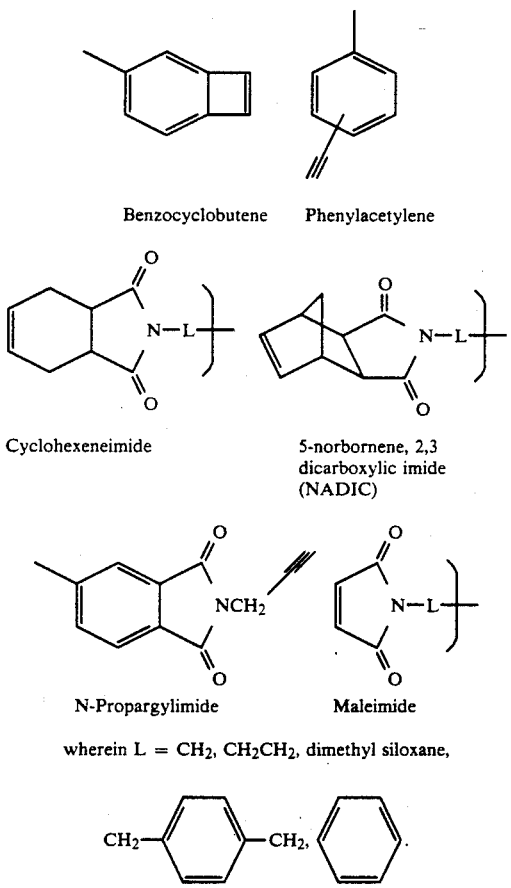

Benzocyclobutene    Phenylacetylene

Cyclohexeneimide    5-norbornene, 2,3 dicarboxylic imide (NADIC)

N-Propargylimide    Maleimide wherein L = $CH_2$, $CH_2CH_2$, dimethyl siloxane, The most preferred primary amine precursors are propargylamine (CAS No. 2540-71-7), aminophenyl acetylene (CAS No. 54060-30-9); and 4-aminobenzocyclobutene.

The poly(dianhydride) and the primary amino precursor are preferably reacted together in the presence of a solvent or mixture of solvents. The preferred solvents include either N,N'-dimethylacetamide, 1-methyl-2-pyrrolidinone, and N,N'-dimethyl formamide alone.

The most preferred solvent system is N,N'-dimethylacetamide.

Generally, it is preferred to add sufficient solvent to dissolve the poly(dianhydride) reactant. The preferred amount of solvent is such that there is about 0.01 to about 0.05 moles poly(dianhydride) reactant per liter of solvent. In addition, molecular sieves are added to the reaction mixture to aid this dehydration reaction. Preferably, molecular sieves of about four angstroms are employed.

The reaction is generally carried out at a temperature of about 100° C. to about 200° C., preferably to about 110° C. to about 185° C. The reaction pressure is generally preferred to be atmospheric; although superatmospheric and subatmospheric pressures may be used.

Preferably, the mole ratio of the poly(dianhydride) precursor to the primary amine precursor is from about 1:2 to about 1:6, most preferably about 1:4.

The reaction is preferably carried out under an inert atmosphere such as dry nitrogen or dry argon. The most preferred atmosphere is a dry argon atmosphere. Any standard chemical reacting vessel which allows for heating and for the use of a dry inert atmosphere may be used herein.

Any standard recovery and purification steps for this product may be employed. The preferred recovery and purification steps for these poly(dianhydrides) terminated with reactive end groups involve the vacuum evaporation of the solvent away from the product followed by slowly introducing the mother liquor into water and then employing a standard solid-from-liquid filtration step, most preferably, vacuum filtration.

Several illustrative compounds of formulae (III) and (IV), above, include the following:
Propargyl terminated poly(ODPA)
Propargyl terminated poly(DSDA)
Propargyl terminated poly(BTDA)
Phenyl Acetylene terminated poly(ODPA)
Phenyl Acetylene terminated poly(DSDA)
Phenyl Acetylene terminated poly(BTDA)

The poly(dianhydrides) terminated with reactive end groups of formulae (III) and (IV) may be used in formulations for adhesives, dielectrics, and composite matrices.

The poly(dianhydrides) of formulae (I) and (II) may also be converted into novel poly(amic acids).

This reaction encompasses the reaction of the poly(dianhydrides) of formulae (I) and (II) with a polyamine, preferably an aromatic diamine.

The preferred diamines are aromatic diamines such as p-phenylenediamine, 2,2'-bis(4-aminophenyl) hexafluoropropane, 2,2'-bis(4-aminophenyl) methane, 2,2'-bis[4-(4  -aminophenoxy)phenyl]hexafluoropropane, 4,4'-oxydianiline, 4,4'-diamino diphenylsulfone (referred to herein as DADS), amine-terminated poly(dimethyl) siloxane, amine-terminated poly(diphenyl) siloxane, and 4,4'oxydianiline or 4-aminophenylether [CAS No. 101-80-4] (also referred to herein as ODA).

This reaction is generally carried out at room temperature and atmospheric pressure in the presence of a solvent.

Furthermore, the reaction is preferably carried out under an inert atmosphere such as dry nitrogen or dry argon. Any standard chemical reaction vessel may be used which allows for stirring and for the use of an inert atmosphere.

Preferably, the mole ratio of the poly(dianhydride) to the aromatic diamine is from about 1:1 to about 1:1.4.

Most preferably, the mole ratio is from about 1:1.1 to about 1:1.3.

The preferred solvents for this reaction include N,N'-dimethylacetamide, N,N'-dimethylformamide, 1-methyl-2-pyrrolidinone, and ethyl lactate. The most preferred are 1-methyl-2-pyrrolidinone and ethyl lactate.

Any conventional recovery and purification steps may be used for these poly(amic acids).

Illustrative poly(amic acids) of formulae (V) and (VI) include the following:

Poly(amic acid) of poly(4,4'-oxydiphthalic anhydride and 4,4'-diamino diphenylsulfone;

Poly(amic acid) of poly(3,3'4,4'-diphenylsulfone tetracarboxylic dianhydride) and 2,2'-bis(4-aminophenyl) hexafluoropropane; and Polyamic acid of poly(3,3',4,4'-benzophenone tetracarboxylic dianhydride) and 2,2'-bis(4-aminophenyl) hexafluoropropane.

The poly(amic acids) for formulae (V) and (VI) be used in formulations for adhesives, dielectrics, and composite matrices.

The poly(amic acids) of the present invention may be reacted with a primary amine compound to produce a poly(amic acid) terminated with a reactive end group of formulae (VII) or (VIII).

The primary amine compound used as a precursor for compounds of formulae (VII) and (VIII) is denoted generically as $H_2N-Z$, wherein Z is defined as above.

The preferred reactive amino end group precursors are propargylamine (CAS No. 2540-71-7), 4-aminophenyl acetylene (CAS No. 54060-30-9); and 4-aminobenzocyclobutene.

The poly(amic acid) and primary amine precursor are preferably reacted together in the presence of a solvent or mixture of solvents. The preferred solvents include either N,N'-dimethylacetamide, 1-methyl-2-pyrrolidinone, and N,N'-dimethyl formamide alone.

Generally, it is preferred to add sufficient solvent to dissolve the poly(amic acid) reactant. The preferred amount of solvent is such that there is about 0.01 to about 0.05 moles poly(amic acid) reactant per liter of solvent.

The reaction is generally carried out at a temperature from about 100° C. to about 200° C., preferably to about 110° C. to about 185° C. The reaction pressure is generally preferred to be atmospheric; although superatmospheric and subatmospheric pressures may be used. Preferably, the mole ratio of the poly(amic acid) precursor to the primary amine compound is from about 1:2 to about 1:6, most preferably about 1:4.

The reaction is preferably carried out under an inert atmosphere such as dry nitrogen or dry argon. The most preferred atmosphere is a dry argon atmosphere. Any standard chemical reacting vessel which allows for heating and for the use of a dry inert atmosphere may be used herein.

Any standard recovery and purification steps for this product may be employed. The preferred recovery and purification steps for these poly(amic acids) terminated with reactive amino end groups involve the vacuum evaporation of the solvent away from the product followed by slowly introducing the mother liquor into water and then employing a standard solid from liquid filtration step, most preferably, vacuum filtration.

Several illustrative compounds of formulae (VII) and (VIII), above, include the following:

Phenylacetylene Terminated [(Poly ODPA)-ODA]
Phenylacetylene Terminated [(Poly BTDA)-ODA]
Phenylacetylene Terminated [(Poly DSDA)-ODA]
Propargyl Terminated [(Poly ODPA)-DADS]
Propargyl Terminated [(Poly BTPA)-DADS]
Propargyl Terminated [(Poly DSDA)-DADS]

The poly(amic acids) having terminated with reactive end groups of formulae (VII) and (VIII) may be used in formulations for adhesives, dielectrics, and composite matrices.

The above-noted poly(amic acids) of formulae (V) and (VI) may be converted into novel poly(imide) compounds of formulae (IX) and (X) by subjecting them to either chemical imidization or elevated temperatures in the presence of a solvent. Preferably, this reaction is carried out at atmospheric pressure under an inert gas atmosphere (e.g., dry nitrogen or dry argon). Any standard film casting apparatus which allows for thermal curing of the precursor poly(amic acids) and for removal of the carrier solvents may be used.

A preferred cure schedule for making these poly(imides) is to cure the poly(amic acids) for one hour at 150° C. followed by curing for two hours at 250° C.

Preferred carrier solvents for this reaction include N,N'-dimethylacetamide, N,N'-dimethylformamide, 1-methyl-2-pyrrolidinone, and ethyl lactate. The most preferred solvents are 1-methyl-2-pyrrolidinone and ethyl lactate.

Illustrative poly(imides) of formulae (IX) and (X) include the following:

Poly[hexafluoropropyl diphenyl poly(3,3'4,4'-diphenylsulfone dianhydride)]

Poly[hexafluoropropyl diphenyl poly(3,3'4,4'-benzophenone dianhydride)]

Poly[oxydiphenyl poly(3,3'4,4'-benzophenone dianhydride)]

Polyimide of poly(3,3',4,4'-benzophenone tetracarboxylic dianhydride) and 2,2'-bis(4-aminophenyl) hexafluoropropane Polyimide of poly(3,3',4'4-diphenylsulfone tetracarboxylic dianhydride) and 2,2'-bis(4-aminophenyl) hexafluoropropane Polyimide of poly(3,3',4'4-benzophenone tetracarboxylic dianhydride) and 4,4'-oxydianiline The poly(imides) for formulae (IX) and (X) may be ingredients in adhesives, dielectrics, and composite matrice compositions.

The above-noted poly(amic acids) having reactive end groups of formulae (VII) and (VIII) may be converted into novel poly(imide) compounds having reactive end groups of formulae (XI) and (XII).

Illustrative poly(imides) of formula (XI) and (XII) include the following:

Phenyl Acetylene Terminated [Poly(PMDA)-ODA]-Polyimide
Phenyl Acetylene Terminated [Poly(ODPA)-ODA]-Polyimide
Phenyl Acetylene Terminated [Poly(BTDA)-ODA]-Polyimide
Propargyl Terminated [Poly(PMDA)-DADS]Polyimide
Propargyl Terminated [Poly(OSDA)-DADS]Polyimide
Propargyl Terminated [Poly(ODPA).DADS]Polyimide These poly(imide) compounds having reactive end groups of formulae (XI) and (XII) may be ingredients in adhesives, dielectrics, and composite matrix compositions.

The following Examples are provided to further illustrate the present invention. All parts and percentages are by weight and all temperatures are by degrees Celsius, unless explicitly stated otherwise.

EXAMPLE 1

SYNTHESIS OF POLY(OXYDIPHTHALIC ANHYDRIDE)

A 1,000 ml 3-necked round bottom flask fitted with an overhead mechanical stirrer and a condenser was charged with triethyl phosphite (581 grams, 3.50 moles). This compound was then deoxygenated with dry argon for 20 mins. To this solution was added 4,4'oxydiphthalic anhydride (ODPA) (31.0 grams, 0.10 moles); the solution was then heated to reflux under argon (approximately 135° C.) for 24 hours. An orange precipitate formed on the sides of the flask and on the stirring rod. The mixture was cooled to 0° C. and the material was collected via vacuum filtration, washed with 500 ml of cold methanol, and dried overnight at 80° C. to yield 22.96 g or product. Characteristic IR peaks: 1,776, 1,018 cm$^{-1}$. Gel permeation chromatography showed $M_n=1,870$, $M_w=2,445$.

EXAMPLE 2

SYNTHESIS OF POLY(3,3',4,4'-BENZOPHENONE TETRACARBOXYLIC DIANHYDRIDE)

The same reaction as above was carried out, except (3,3',4,4'-benzophenone tetracarboxylic dianhydride) (32.2 grams, 0.10 moles) was substituted for ODPA. These reactants were refluxed for 12 hours. Again, an orange material precipitated, was vacuum filtered, and washed with methanol to yield 30.80 grams of an orange-yellow solid. Characteristic IR peaks: 1,785, 1,017 cm$^{-1}$. Gel permeation chromatography showed $M_n=3,569$, $M_w=10,682$.

EXAMPLE 3

REACTIVE END CAPPING OF POLY(4,4'-OXYDIPHTHALIC ANHYDRIDE)

A 500 ml glass round bottom flask was fitted with a condenser and overhead mechanical stirrer. This flask was charged with dimethyl acetamide (40 ml) and poly(4,4'-oxydiphthalic anhydride) (13.7 grams, $M_w=2,445$). This mixture was warmed to 50° C. and stirred until all materials were dissolved. At this time, m-aminophenyl acetylene (2.4 grams, 0.0205 moles) was added and the reaction temperature was raised to 135° C. This was followed by the addition of molecular sieves, 4A. Then the mixture was held at 165° C. for 24 hours. The molecular sieves were then removed by filtration through a Celite Pad.

After cooling the reaction mixture, the remaining materials were dropped very slowly into quickly stirred water to precipitate solids. The materials were collected via vacuum filtration on a fritted glass filter. The product was dried overnight in a 100° C. oven. The material remaining was a brown powder (15.11 grams) with a melting range of 135°–150° C., (IR peaks, cm$^{-1}$—3,446, 2,160, 1,777, 1,718, 790).

EXAMPLE 4

REACTIVE END CAPPING OF POLY(3,3',4'-BENZOPHENONE TETRACARBOXYLIC DIANHYDRIDE)

The same reaction, as above, was carried out, except poly(3,3',4,4'-benzophenone tetracarboxylic dianhydride)(10 grams, $M_w=4,224$) was substituted for poly(4,4'-oxydiphthalic anhydride). An orange-brown powder (9.01 grams) with a melting range of 165°–177° C. was recovered (IR, cm$^{-1}$ 3,285, 1,768, 1,720, 1,660, 741, 683).

EXAMPLE 5

SYNTHESIS OF POLY(AMIC ACIDS) FROM POLY(DIANHYDRIDES)

In a 500 ml round bottom flask, 1-methyl 2-pyrrolidinone (250 ml) was sparged with dry argon for 20 minutes. After sparging, poly(BPDA) (25 g. $M_w=1,080$) prepared by the above method was introduced and dissolved with magnetic stirring. At this point, oxydianiline (4.63 grams, 0.023 moles) was introduced and the solution was stirred for 24 hours at room temperature under dry argon.

EXAMPLE 6

SYNTHESIS OF POLY(IMIDES) FROM POLY(AMIC ACID) SOLUTIONS

To convert poly(amic acids) produced above to poly(imide) systems, the mixture can be cast into film form on a suitable substrate (for example, Teflon coated foil). At this point, the solution can be cured either in atmospheric pressure argon or in a vacuum to remove the solvent. Temperatures for this cure can range from 100° to 250° depending upon pressure. After 2–5 hours of cure, the resulting polyimide can be recovered from the surface of the foil.

EXAMPLE 7

SYNTHESIS OF POLY(AMIC ACIDS) TERMINATED WITH REACTIVE END GROUPS

Termination of poly(amic acids) with reactive end groups was accomplished using the amic acid preparation from above with a slight modification in ratios of poly(dianhydride) to aromatic diamine, such as oxydianiline. Instead of the 1:1 molar ratio, the concentration of the aromatic diamine should be added so the ratio is 0.9:1 aromatic diamine:poly(dianhydride), for example oxydianiline (4.17 grams, 0.021 moles):poly (BPDA) (25 grams $M_w=1,080$) in 250 ml of 1-methyl 2-pyrrolidinone sparged with argon. These reactants were stirred for 24 hours at room temperature as above. At the end of 24 hours, a reactive end group, such as aminophenyl acetylene (2.4 grams, 020 moles) was added and stirred at room temperature for 8 hours. At this point, the amic acid terminated with reactive end groups is synthesized. There are various means for adjusting the lengths of the poly(amic acid) segments.

EXAMPLE 8

SYNTHESIS OF POLY(IMIDE) TERMINATED WITH REACTIVE END GROUPS

Poly(imides) with reactive end groups are synthesized from the poly(amic acids) with reactive end groups made in the previous sample. These amic acids in 250 ml of 1-methyl 2-pyrrolidinone are heated for 24 hours at 165° C. to convert amic acids to imides. At this point, the poly(imides) can then be precipitated by pouring the mixture into stirring methanol. After precipitation, the poly(imide) can be collected on a fritted glass funnel and dried in a vacuum oven.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. Poly(amic acid) made by reacting a polyamine with a poly(dianhydride) compound having either formulae (I) or (II):

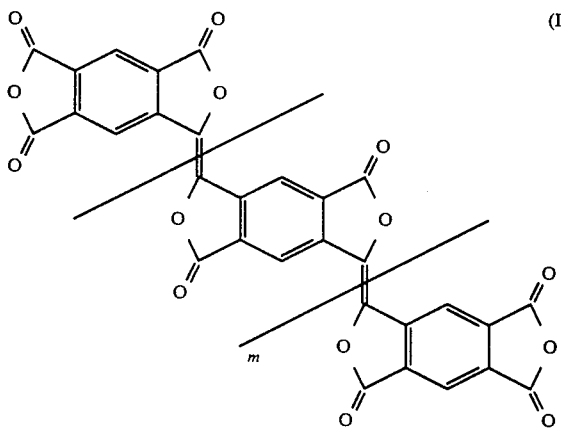

where m is 0 to 50.

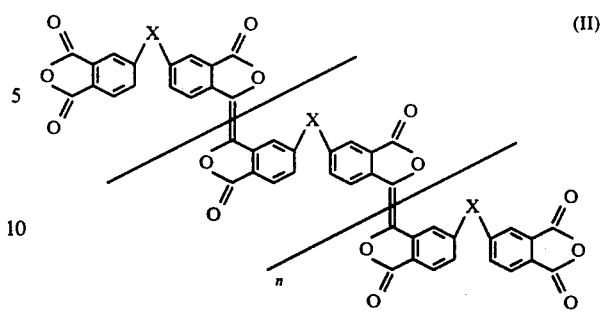

wherein n is 0 to 20 and X is bond junction, oxygen atom, sulfur atom, $SO_2$, $C(CF_3)$, CO, $C(CH_3)_2$, $CF_2-O-CF_2$, $CH_2$, and CHOH.

2. The poly(amic acid) of claim 1 wherein said polyamine is an aromatic diamine.

3. The poly(amic acid) of claim 2 wherein said aromatic diamine is selected from the group consisting of p-phenylene diamine, 2,2'-bis (4-aminophenyl) hexafluoropropane, 2,2'-bis (4-aminophenyl) methane, 2,2'-bis [4-(4'-aminophenoxy)phenyl] hexafluoropropane, and 4,4'-diamino diphenylsulfone.

4. The poly(amic acid) compounds of claim 1 which are:
Poly(amic acid) of poly(4,4'-oxydiphthalic anhydride) and 4,4'-diamino diphenylsulfone
Poly(amic acid) of poly(3,3'4,4'-diphenylsulfone tetracarboxylic dianhydride) and 2,2'-bis(4-aminophenyl) hexafluoropropane
Poly(amic acid) of poly(3,3',4,4'-benzophenone tetracarboxylic dianhydride) and 2,2'-bis(4-aminophenyl) hexafluoropropane.

5. A poly(amic acid) having a reactive acetylene-containing end group made by reacting a poly(amic acid) compound of claim 1 with a polymerizable end group.

6. The poly(amic acid) having a polymerizable end group of claim 5 wherein said end groups are propargylamine, aminophenyl acetylene, aminophenyl acetylene, and 4-aminobenzocyclobutene.

7. A poly(imide) compound made by heat curing a poly(amic acid) of claim 1.

8. A poly(imide) compound having reactive acetylene-containing end groups made by heat curing a poly(amic acid) having end groups of claim 1.

* * * * *